United States Patent
Dantu et al.

(10) Patent No.: US 7,167,443 B1
(45) Date of Patent: Jan. 23, 2007

(54) SYSTEM AND METHOD FOR PACKET LEVEL RESTORATION OF IP TRAFFIC USING OVERHEAD SIGNALING IN A FIBER OPTIC RING NETWORK

(75) Inventors: Ram Dantu, Richardson, TX (US); Gary Ester, Plano, TX (US); Pete O'Connell, Heath, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/393,752

(22) Filed: Sep. 10, 1999

(51) Int. Cl.
*G01R 31/08* (2006.01)

(52) U.S. Cl. ............... 370/218; 370/228; 370/235; 370/395.6; 398/3; 398/5; 398/59

(58) Field of Classification Search ........ 359/115, 359/118, 119; 370/352, 389, 216, 217–240, 370/392, 408, 403, 424, 469, 395.6; 385/24; 398/43, 3, 5, 59
See application file for complete search history.

(56) References Cited

U.S. PATENT DOCUMENTS

| | | | |
|---|---|---|---|
| 5,461,607 A * | 10/1995 | Miyagi et al. | 370/244 |
| 5,487,061 A * | 1/1996 | Bray | 370/252 |
| 5,488,501 A | 1/1996 | Barnsley | |
| 5,572,515 A * | 11/1996 | Williamson et al. | 370/232 |
| 5,805,568 A * | 9/1998 | Shinbashi | 370/223 |

(Continued)

FOREIGN PATENT DOCUMENTS

EP 0 721 275 A2 7/1996

(Continued)

OTHER PUBLICATIONS

Blumenthal, et al.; WDM Optical Tag Switching with Packet-Rate Wavelength Conversion and Subcarrier Multiplexed Addressing; International Conference on Integrated Optics and Optical Fiber Communication Conference; OFC/IOOC; Feb. 21-26, 1999; pp. 162-164; vol. 3.

(Continued)

*Primary Examiner*—Alpus H. Hsu
(74) *Attorney, Agent, or Firm*—Jessica W. Smith; V. Lawrence Sewell

(57) ABSTRACT

An apparatus and a method for forwarding data packets through a fiber optic ring network includes forwarding data packets on a packet by packet basis. A node on the fiber optic ring network decides on a packet by packet basis whether to transmit on the working or protection path. Because this decision is being made on a packet level, reservation of throughput resources no longer is made at a one to one ratio. Rather, protection path resources are reserved at a ratio significantly less than one to one. In one embodiment, no resources are reserved for path restoration or protection path routing. Rather, quality of service provisioning is used to resolve interference situations wherein instantaneous demand exceeds capacity. A node evaluates ring conditions in relation to the demand of traffic resources and the relative quality of service ratings to determine whether and how to forward a packet. Additionally, a node decides whether to use the working or protection path by considering the final destination on the fiber optic ring network, any identified ring conditions and, in some embodiments, quality of service. The ring conditions to which the inventive nodes respond include OSI layer 1, layer 2 and layer 3 conditions.

8 Claims, 10 Drawing Sheets

U.S. PATENT DOCUMENTS

| | | | |
|---|---|---|---|
| 5,815,490 A * | 9/1998 | Lu | 370/223 |
| 6,021,113 A * | 2/2000 | Doshi et al. | 370/228 |
| 6,032,190 A * | 2/2000 | Bremer et al. | 370/389 |
| 6,088,141 A * | 7/2000 | Merli et al. | 359/110 |
| 6,144,633 A * | 11/2000 | Ikeda et al. | 370/217 |
| 6,147,968 A * | 11/2000 | De Moer et al. | 370/225 |
| 6,256,292 B1 * | 7/2001 | Ellis et al. | 370/227 |
| 6,263,443 B1 * | 7/2001 | Anderson et al. | 713/160 |
| 6,282,170 B1 * | 8/2001 | Bentall et al. | 370/225 |
| 6,292,464 B1 * | 9/2001 | Elahmadi et al. | 359/110 |
| 6,295,296 B1 * | 9/2001 | Tappan | 370/349 |
| 6,324,162 B1 * | 11/2001 | Chaudhuri | 370/225 |
| 6,324,175 B1 * | 11/2001 | Shiomoto et al. | 370/351 |
| 6,359,860 B1 * | 3/2002 | Ando | 370/223 |
| 6,400,859 B1 * | 6/2002 | de Boer et al. | 385/24 |
| 6,426,941 B1 * | 7/2002 | Vaman et al. | 370/228 |
| 6,430,176 B1 * | 8/2002 | Christie, IV | 370/261 |
| 6,525,850 B1 * | 2/2003 | Chang et al. | 398/49 |
| 6,532,088 B1 * | 3/2003 | Dantu et al. | 398/43 |
| 6,545,781 B1 * | 4/2003 | Chang et al. | 398/51 |
| 6,901,048 B1 * | 5/2005 | Wang et al. | 370/228 |

FOREIGN PATENT DOCUMENTS

| | | |
|---|---|---|
| EP | 0 827 357 A2 | 3/1998 |
| EP | 0 924 952 A2 | 6/1999 |

OTHER PUBLICATIONS

Hunter, et al.; WASPNETt: A Wavelength Switched Packet Network; IEEE Communications Magazine; Mar. 1999; pp. 120-129; vol. 337; Iss. 3 .

Johnson, David; Survivability Strategies for Broadband Networks; Global Telecommunications Conference, GLOBECOM '96, "Communications: The Key to Global Prosperity"; Nov. 18-22, 1996; pp. 452-456; vol. 1.

* cited by examiner

SYSTEM AND METHOD FOR PACKET LEVEL RESTORATION OF IP TRAFFIC USING OVERHEAD SIGNALING IN A FIBER OPTIC RING NETWORK

CROSS REFERENCE TO RELATED APPLICATIONS

This application is related to and includes by reference the following application in its entirety, said application being concurrently filed herewith this application:

Title: SYSTEM AND METHOD FOR PACKET LEVEL DISTRIBUTED ROUTING IN FIBER OPTIC RINGS Inventors: Ram Dantu, Pete O'Connell Filing Date: Sep. 10, 1999

Ser. No.: 09/393,747

BACKGROUND

1. Technical Field

The present invention relates generally to data transmission in fiber optic ring networks, by way of example, the synchronous optical networks, (SONET networks) and Synchronous Digital Hierarchy networks (SDH networks) and more particularly, to the routing of IP data packets through the fiber optic ring networks including SONET and SDH networks.

2. Related Art

New networks and information exchange capabilities that were unimaginable even in recent times are being developed and implemented in a way that impacts businesses and individuals in a significant way. For example, standalone computers may now be integrated with wireless radio telephones to allow the transmission of information from the computer to a destination by way of a wireless communication network and then by way of the internet.

The recent explosion of the internet is creating the capability and desire for networks of all types to be integrated and coupled to exchange data signals carrying the varying types of information. In many cases, the same data also will also be transported through a local area network (LAN) prior to being delivered to the internet. Thus, by way of example, a digitized signal can be transported from a source through a LAN and through the internet, to a final destination. Moreover, within the internet portion itself, there may be a need to transport the user data through a backbone data transport infrastructure, by way of example, through a fiber optic ring network.

Generally speaking, the internet is, in essence, a collection of many large and small computer networks that are coupled together over high speed backbone data links such as T-1, T-3, OC-1 and OC-3. Stated differently, the internet is a network of networks. As a result of the creation of the internet, worldwide access may be achieved. People and their equipment may now communicate from most any civilized point to another in a fast and relatively inexpensive medium.

While it is popular to think of the internet as one network of networks, there are other such internets that are in existence and that are under development. For example, the network now commonly known as the internet was originally a network of institutional networks including university networks. As a result of the commercialization of the internet and the resultant reduction in quality of service, new generation internet type networks are under development to better achieve the purposes of the original "internet". Moreover, new international standards and protocols are being approved to create additional and enhanced internets. For the sake of simplicity, however, each of the worldwide internet networks will be referred to collectively as the internet.

Regarding its physical aspects, the internet is a packet switched network that is currently based upon a group of protocols known as transmission control protocol/internet protocol (TCP/IP). TCP is a connection-oriented protocol that first establishes a connection between two computer systems that are to exchange data. TCP then breaks a given digital information signal into packets having a defined format. The packets are then attached to headers that are for containing control and address information.

For example, in addition to a destination address, a TCP packet typically contains a sequence number that is to be used by the destination in reconstructing a signal that is similar to the original digital information that was broken into packets at the originating end. TCP packets also typically include port IDs, checksum values and other types of control information as is known by those skilled in the art.

IP protocol is used for routing purposes. Thus, the IP protocol includes the destination and originating addresses and default gateway identifiers. IP routers, therefore, are operable to evaluate IP protocol information for routing an IP data packet and to evaluate TCP protocol information for error control and other similar purposes.

In order to make communication devices created by companies throughout the world compatible with each other to create local area networks and worldwide networks such as the internet, protocols and standards are often defined. These protocols and standards are used to guide the design of the communication devices, and more specifically, to guide the design of the operating logic and software within the devices. While communication devices that are designed in view of these standards do not always follow the suggested models exactly, they are usually compatible with the protocol-defined interfaces (physical and logical). In order to appreciate the construction and operation of many devices, it is important to generally understand the concepts of some of the significant protocol standards and models.

One important model that currently guides development efforts is the International Standards Organization (ISO) Open Systems Interconnection (OSI) model. ISO/OSI provides a network framework or model that allows equipment from different vendors to communicate with each other. The OSI model organizes the communication process into seven different categories or layers and places these layers in a sequence based on their relation to the user. Layers 1 through 3 deal provide actual network access and control. Layers 4 through 7 relate to the point to point communications between the message source and destination.

More specifically, the seven layers in the OSI model work together to transfer communication signals through a network. Layer 1 includes the physical layer meaning the actual hardware that transmits currents having a voltage representing a bit of information. Layer 1 also provides for the functional and procedural characteristics of the hardware to activate, maintain, and deactivate physical data links that transparently pass the bit stream for communication between data link entities. Layer 2 is the data link layer or the technology specific transfer layer that effectuates and controls the actual transmissions between network entities. For example, layer 2 provides for activation, maintenance, and deactivation of data link connections, character and frame synchronization, grouping of bits into characters and frames, error control, media access control and flow control.

Layer 3 is the network layer at which routing, switching and delaying decisions are made to create a path through a network. Such decisions are made in view of the network as a whole and of the available communication paths through the network. For example, decisions as to which nodes should be used to create a signal path are decided at layer 3. As may be seen, layers 1, 2 and 3 control the physical aspects of data transmission.

While the first three layers control the physical aspects of data transmission, the remaining layers relate more to communication functionality. To illustrate, layer 4 is the transport layer that defines the rules for information exchange and manages the point to point delivery of information within and between networks including providing error recovery and flow control. Layer 5 is the session layer that controls the basic communications that occur at layer 4. Layer 6 is the presentation layer that serves as a gateway (a type of "software" interface) between protocols and syntax of dissimilar systems. Layer 7 is the application layer that includes higher level functions for particular application services. Examples of layer 7 functions include file transfer, creation of virtual terminals, and remote file access.

Each of the above defined layers are as defined by the OSI model. While specific implementations may vary from what is defined above, the general principles are followed so that dissimilar devices may communicate with each other.

With respect to the forgoing discussion regarding the seven OSI layers, IP is a layer three protocol. In contrast, many of the backbone data transport infrastructures utilize a different layer protocol than an internet router.

Many of the common backbone data transport systems utilized include time division multiplexed (TDM) double ring transmission systems. Double ring TDM systems are generally known, especially for fiber-optic communication networks. In order to maintain transmission in the event of a fault on one of the channels or communication links, it is typically common to find ring transmission systems in which transmissions occur in two directions. Specifically, transmissions occur in one direction through all of the nodes in the ring in a working path and through an opposite direction in a protection path. The protection path is, traditionally, a redundant path for transmitting signals in a failure condition. Examples of fiber optic TDM systems include the SONET and SDH double ring fiber optic communication systems used in North America and Europe, respectively.

In ordinary conditions, either the user traffic (data) in the redundant path in these double ring systems is not routed through the protection path or, alternatively, it is routed but is not processed by a destination. At the same time, its communication channels are reserved as an alternate path during failure conditions. The redundant path is typically used to route the data signals in an opposite direction from the working path so that data that is to be routed to a destination node located, "downstream" from the failure condition may still be delivered to the destination node.

One problem with this approach, however, is that the capacity of the redundant ring must be reserved as a redundant path. Transmission efficiency and throughput capacity must be sacrificed to provide data protection. Additionally, error conditions that prompt a node to switch to the protection path often are related to hardware (layer 1) problems in which communications are not being successfully transmitted in a communication link. Switching does not occur for those conditions in which switching may be desirable even if there is not a hardware related error. For example, switching might be desirable to alleviate user traffic congestion.

Additionally, several challenges exist in implementing dual ring topologies. For example, it is necessary for the switching from the working path to the protection path to occur quickly in the event of a fault so that a minimal amount of information is lost. Typically, switching occurs at the layer 1 level to minimize the down time. As a result, however, little error protection is provided at the hardware level for failures. Additionally, layer 1 switching results in the switching of entire data transport pipelines.

To accomplish fast switching, layer 1 overhead signaling messages are generated and transmitted back to the ingress node (among other nodes) identifying the fault condition so that the protection switching may occur quickly. More specifically, layer 1 overhead signaling messages are transmitted by the nodes detecting the error (typically the two nodes on either traffic side of the detected problem) on a communication link so that the ingress node may effectuate the change on a quick basis. Typically, the ingress node includes dedicated circuitry for reading, interpreting and quickly responding to the overhead signaling message to effectuate a change. As is implied by the foregoing discussion, the overhead signaling is set upon the occurrence of a significant hardware failure in a communication link.

Historically, delays that are encountered in the internet have been acceptable, though not well liked, in the context of computer to computer communications. As other types of data are transported over the internet, by way of example, either voice or video, there will be a need for transporting data in large quantities in a quick manner. Due to this reason, failure recovery should be fast. There is, therefore, an increasing need for integrating internet communication networks with fiber optic ring networks utilizing a TDM protocol for transporting data because of the speed and throughput capacity of fiber optic ring networks. Accordingly, there is a need for a fiber optic ring network node that is capable of reliably and quickly transporting user traffic to and from the internet.

SUMMARY OF THE INVENTION

To overcome the shortcomings of the prior systems and their operations, the present invention contemplates a fiber optic ring network node that includes a forwarding table that allows the node the capability of forwarding a data packet through a working path or through a protection path in a fiber optic ring network on a packet by packet basis. The node further includes circuitry that prompts the node to generate an overhead signal on the fiber optic ring network to all other nodes connected to the ring to advise them of a detected failure condition in a communication link that is adjacent to the node. The types of failure conditions that result in the overhead signal being generated by the node included typical OSI layer 1 faults as well as layer 2 faults and layer 3 conditions. Layer 3 conditions include traffic congestion and other similar conditions. Because each node on the fiber optic ring network includes the circuitry for generating the overhead signal whenever a failure condition occurs in a communication link, two overhead signals will typically be generated, one by each node adjacent to the failure condition location.

Responsive to the receipt of at least one overhead signal identifying a communication link failure, a node serving as an ingress node for IP user traffic performs packet level path restoration on a very fast basis. Subsequent data packets whose ordinary working path routes are affected by the communication link failure may be routed by its ingress node on a protection path route to reach its destination node.

The inventive system is designed to provide very fast packet level path restoration. Because the overhead signal that advises all of the nodes on the fiber optic ring network is generated at the layer 2 level of the OSI model, the signal is generated very quickly after the communication link failure occurs. In a preferred embodiment, the computer circuitry is optimized to generate the overhead signal within fifteen milliseconds of the failure condition occurring. Similarly, the ingress nodes are formed to perform path restoration within thirty five milliseconds of receiving the overhead signal. In total, therefore, path restoration occurs within fifty milliseconds of a failure condition occurring.

The types of failures that prompt the node to generate the overhead signal advising of a failure include not only the layer 1 and layer 2 failures, but also the layer 3 types of network conditions. Accordingly, even a condition such as congestion in a communication link may prompt nodes on the network to switch from the first to the second ring. As such, even layer 3 conditions that have, in the past, gone undetected for as long as a minute or more, are detected and responded to by the inventive systems disclosed herein within fifty milliseconds.

Because the invention contemplates packet level path restoration depending on factors such as destination and path conditions, there no longer exists a need to reserve large amounts of bandwidth on the second fiber optic ring network to provide protection path capacity. Additionally, in one embodiment of the invention, no reservations are made for protection path switching. Rather, each signal is assigned a quality of service (QoS) priority that is used to resolve interference conditions wherein signals are transmitted in order of priority. As a result, large gains in fiber optic ring network throughput capacity may be realized.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Description of a Needed Solution

Modern networks are being designed to transport user traffic containing varying types of information including voice, image, text, control signals and numerical data. The user traffic is routed through access multiplexers, gateways (interface devices for systems communicating using differing formats), add drop multiplexers (ADMs), fiber optic cross connects, ATM switches and internet protocol (IP) routers. Multiple layers of routing, multiple logical layers of path establishment, and different technologies guide the routing and paths used for transporting the user traffic.

As mentioned before, the internet is a plurality of networks that are coupled by high capacity data transport mediums. One very important data transport medium is the fiber optic ring network such as SONET or SDH networks (collectively, "fiber optic ring networks). Fiber optic ring networks typically utilize a protocol that includes data packets having a fixed or defined length. For example, a SONET network "cell" is a data packet that allocates 48 bytes for data and 5 bytes for a header.

Fiber optic ring networks transport optical signals in a working path and, at least occasionally, in a protection path using one of many time division multiplexing data transmission formats. Some systems include a dual ring topology while other include a single ring that transmits user traffic in two directions (bi-directional). Because fiber optic ring networks will increasingly be used to transport IP user data as the importance of the internet continues to grow, the fiber optic ring networks and IP networks must be made to coexist in a compatible and acceptable manner. By some estimates, IP traffic will be the most common type of traffic transported over fiber optic ring networks in the next century.

Accordingly, there is an increasing need for transporting IP over fiber optic ring networks. The inventors herein have observed that combining IP and TDM to meet this need, however, requires level 3 type functionality to be performed in addition to level 1 and level 2 functionality on the fiber optic ring networks. This combination is necessary in order to have a system that is able to fully interact with IP Routers and that can dynamically make routing decisions on a fiber optic ring network as communication link problems are detected.

Potential Solutions

Figure 1:
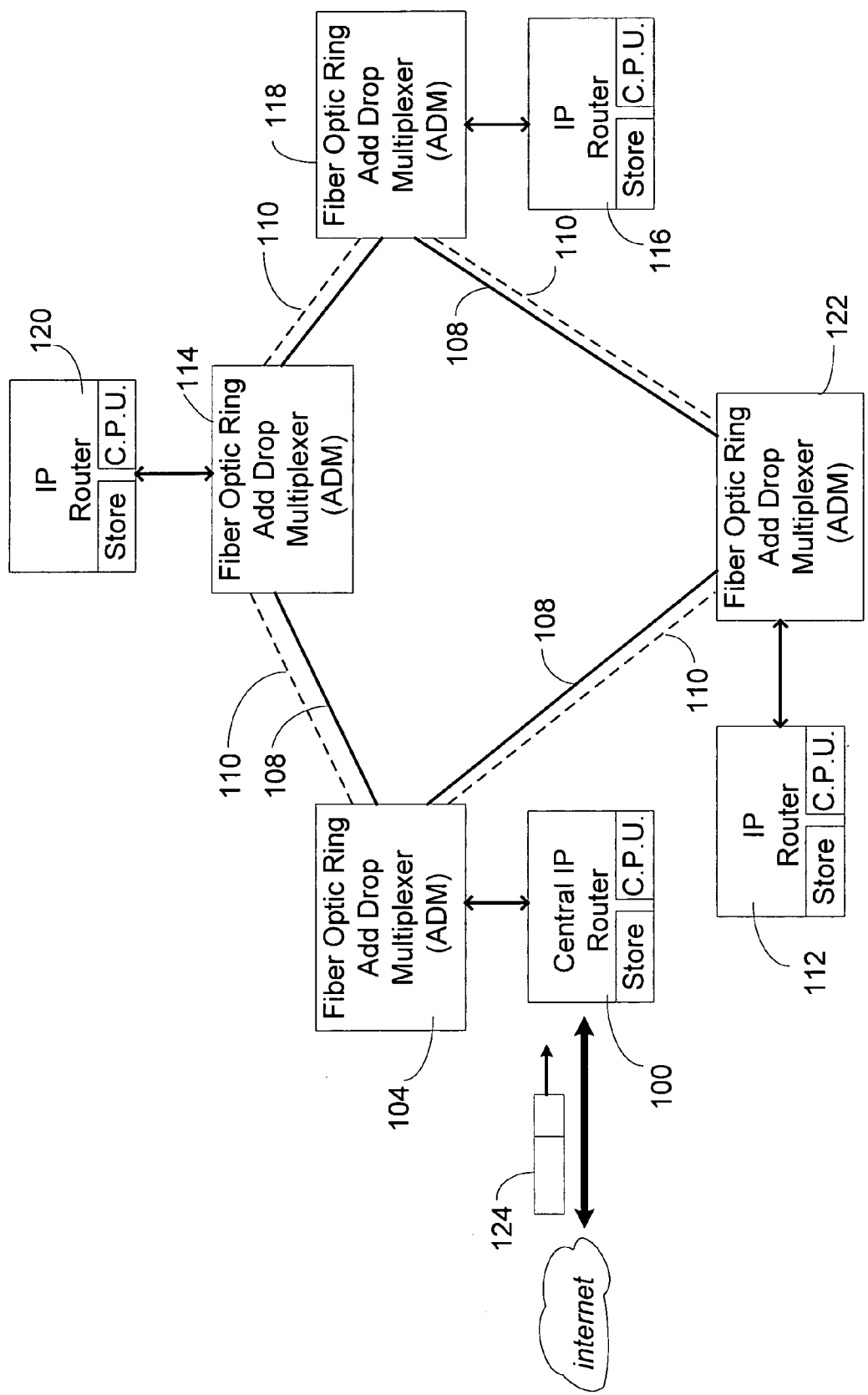
FIG. 1 is a functional block diagram of a schematic of a fiber optic ring network for transporting IP user traffic.

FIG. 1 is a functional block diagram of a schematic of a fiber optic ring network for transporting IP user traffic. Referring now to FIG. 1, central IP router 100 is connected to deliver and receive IP user traffic to and from add/drop multiplexer (ADM) 104. ADM 104 is coupled to transmit and receive user traffic over fiber optic ring 108 in a TDM format. Central IP router 100 is coupled to IP routers 112, 116 and 120 via ADMs 104, 114, 118 and 122, respectively through dedicated paths in the fiber optic ring network. The ADMS provide transparent routing/forwarding of the user traffic for which IP router 100 is the ingress node. Generally, each of the routers 100, 112, 116 and 120 are similar in structure.

IP router 100 is a "central" IP router for all user traffic for which IP router 100 was the ingress point for the fiber optic ring network. With respect to external IP routers, the fiber optic ring network provides a transport layer and is transparent.

As may be seen, central IP router 100 also is connected to the internet to receive internet user traffic as well as internet parameter data 124 as shown in FIG. 1. Internet parameter data includes information regarding networks and computer systems that are coupled to the internet as well as path information (e.g., communication link failures). Central IP router 100 uses the internet parameter information to determine IP packet routing whenever it receives a packet of data that is to be transmitted to a specified location.

In operation, central IP router 100 receives user traffic in IP packet form from, by way of example, the internet and determines where the packet should be routed. For those packets that it determines should be routed through the fiber optic ring network, central IP router 100 produces the user traffic to the fiber optic ring ADM without any knowledge of the fiber optic ring architecture or its available paths. Central IP router 100 merely specifies the destination IP router address and allows ADM 104 to forward the IP packets to the ADM that is coupled to the specified IP router that is specified in the IP path routes. Stated differently, central IP router 100 treats the ADM and the fiber optic ring merely as a transport layer.

One less desirable effect of this configuration is that the IP router does not receive or fully evaluate information regarding topology (including layer 1 or layer 2 failure information) or restoration capability, for the fiber optic ring. Stated differently, the layer 3 routing functionality of central IP router 100 generally does not include analysis of layer 1 and layer 2 operations in the fiber optic ring. Thus, the layer 3 functionality of central IP router 100 frequently detects a layer 1 failure condition in the fiber optic ring only whenever user traffic fails to reach a destination.

One advantage of the configuration of FIG. 1 is that it provides for fast switching times in the fiber optic ring in the event of a layer 1 or layer 2 failure within the ring. A disadvantage is cost because it requires a full IP router and an ADM at each node of the fiber optic ring in addition to a separate star or mesh network coupling each IP router in the network to the central IP router 100.

That the fiber optic ring performs switching within its network in response to a failure transparently with respect to the IP router suggests that throughput redundancy is required. In other words, the capacity of the working paths in a fiber optic ring network must be duplicated in a protection path, such as path 110 in FIG. 1, to have a system that transparently switches user traffic paths whenever a communication link failure occurs. It is common, by way of example, to have channels of at least 155 Mbps capacity to be fully reserved on the protection path for corresponding channels on the working path. Thus, while the solution of FIG. 1 is advantageous in that protection switching occurs quickly at the layer 1 and layer 2 levels, it is not an economic solution in terms of transport efficiency.

Figure 2:
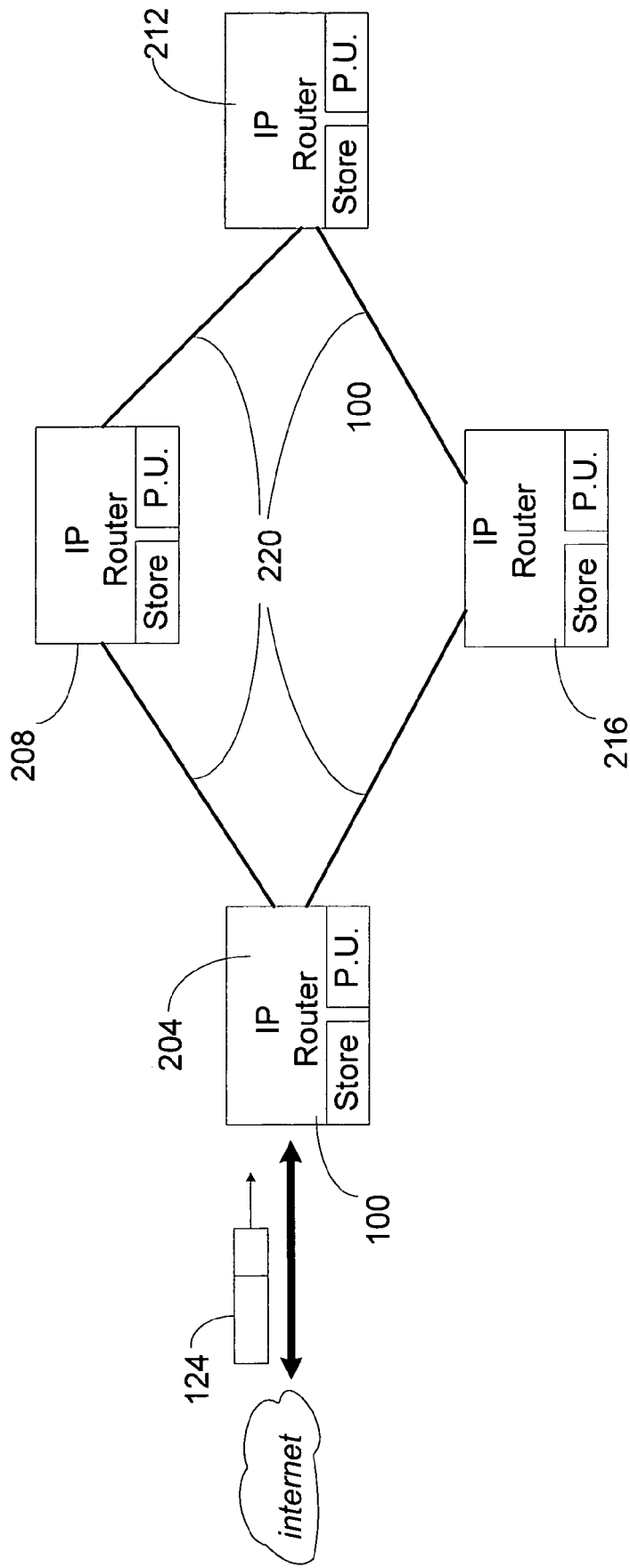
FIG. 2 is a functional block diagram of a fiber optic ring network including a plurality of IP routers for transporting IP user traffic.

FIG. 2 is a functional block diagram of a fiber optic ring network including a plurality of IP routers for transporting IP user traffic. Referring now to FIG. 2, a central IP router 204 is coupled to IP routers 208, 212 and 216 via fiber optic ring 220. IP router 204 also is coupled to receive user traffic and internet parameter data 124 from an external source (e.g., the internet).

In operation, central IP router 204 receives user traffic and routes it through the fiber ring network of IP routers according to IP addresses specified in the headers of the IP packets according to TCP/IP formats and protocols. One advantage of the network of FIG. 2 is that it is less expensive than the network of FIG. 1 because it does not require the ADMs to route the IP user traffic yet it is capable of routing IP user traffic over a fiber optic ring network. A disadvantage observed by the inventors of this application, however, is that the IP routers 204–216 of FIG. 2 operate at layer 3 of the OSI model. Accordingly, in the event of a layer 1 or layer 2 type of communication link failure, it may take tens of seconds or even minutes to detect the failure by the layer 3 functionality of IP router 204. Typically, communication link failures are detected at layer 3 when the IP router transmitting an IP packet of user traffic does not receive an expected signal. It would be advantageous to have a system in which functionality of layers 1 through 3 are provided in a system capable of responding to failures and conditions detected at any layer within fifty milliseconds.

Description of the Preferred Solutions

Figure 3:
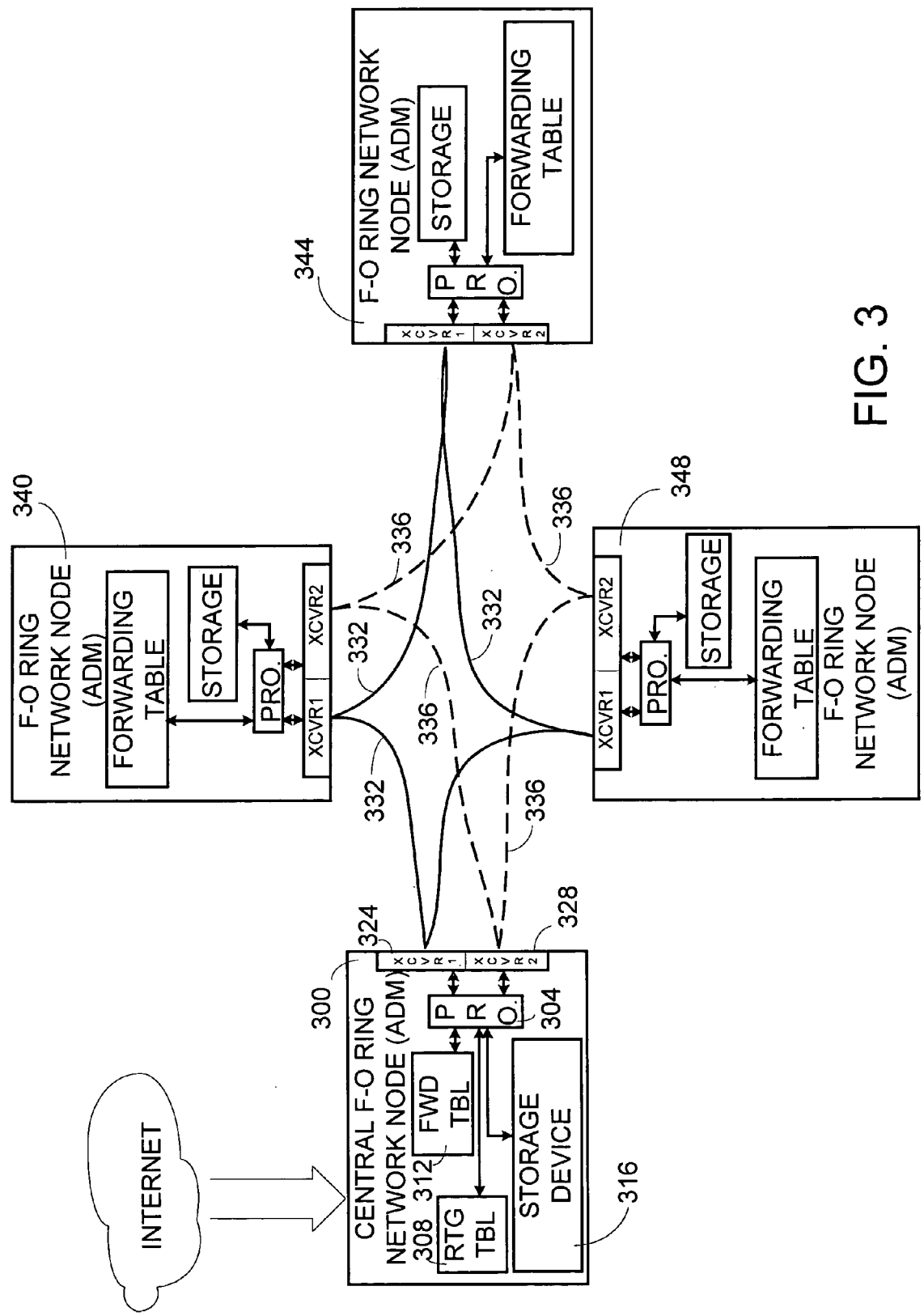
FIG. 3 is a functional block diagram of a fiber optic ring network including a plurality of nodes for routing IP user traffic over a fiber optic ring network according to a preferred embodiment of the invention.

FIG. 3 is a functional block diagram of a fiber optic ring network including a plurality of nodes for routing IP user traffic over a fiber optic ring network according to a preferred embodiment of the invention. Referring now to FIG. 3, a node 300 includes a processor 304. Processor 304 is coupled to communicate with a memory 308 for storing a routing table, a memory 312 for storing a forwarding table, and a storage device 316 for storing computer instructions. The computer instructions are instructions that define the functions that are to be performed by node 300 including creating the routing and forwarding tables stored in memories 308 and 312, respectively.

Processor 304 also is coupled to a pair of transceivers 324 and 328 (interface devices) for transceiving communication signals on a first and a second ring of the fiber optic ring network. Traditionally, the first ring is the working path ring and the second ring comprises a protection path ring wherein the amount of reserved capacity is equal to the working path capacity. As will be described in greater detail, however, the invention contemplates utilizing both rings for carrying working path traffic. Unlike the traditional approach of reserving equal resources for working path as well as for protection path, the amount of resources reserved for working paths is greater than what is reserved for the protection paths in the described embodiments of the invention.

Nodes 340, 344 and 348 each include a processor communicatively coupled with a memory for storing a forwarding table and a storage device for storing computer instructions that defined operational logic and responses for the nodes. Additionally, each of the nodes 340, 344 and 348 include a pair of transceivers for transceiving communication signals on the first and second rings. As may be seen, for the purposes of explaining the operation of the invention herein, the nodes 340, 344 and 348 do not include a memory for storing a routing table.

In the described embodiments of the invention, each of the nodes 300, 340, 344 and 348 include the elements and logic described herein. The different nodes may have different functionality. For example, node 300 is, in the described embodiment, a "central node" meaning that it is the ingress node for user traffic. Each node may serve as an ingress node. Only one node is described as an ingress node for simplicity. Additionally, while not explicitly shown herein, nodes 300, 340, 344 and 348 can also include a transceiver port for receiving and transmitting IP user traffic from and to the internet and may act as an ingress or central node. Accordingly, the nodes can include memory for storing routing tables in an alternate embodiment. The additional logic devices and transceivers are not explicitly shown herein for simplicity.

In operation, the invention herein includes many different inventive processes and methods. In general, however, central node 300 receives IP user traffic from the internet and converts the IP user traffic to a format suitable for the fiber optic ring network of FIG. 3. For example, in the described embodiment, a the traffic is conducted in a TDM format.

More specifically, a central node 300 receives the IP user traffic, converts it to a specified format, e.g., a TDM format, and then decides how to properly route the user traffic according to its routing and forwarding tables stored within its memory as will be described in greater specificity below. To transmit the user traffic, in the preferred embodiment, node 300 inserts a label in the header of the user traffic in the described embodiment. The nodes within the network then utilize a multi-protocol label switching (MPLS) to forward the packet through the network.

While different types of packets and forwarding schemes may be used, the described embodiment includes using an MPLS scheme in which each node examines a label value in a received packet, determines a corresponding label value that implicitly defines several parameters including the next path and communication link, and then transmits the packet with the corresponding label value.

Additionally, the inventive nodes include logic within the storage devices that prompt the processing unit to generate an overhead signal responsive to the detected failure condition. The overhead signal is transmitted by at least one node that detects the communication link condition or failure in an adjacent communication link to all other nodes in the fiber optic ring network including the central or ingress node 300. Each ingress node in the network, for example, node 300, responds to the received overhead signals by assigning labels having label values that cause all subsequent packets whose working path includes going through the failed communication link to be transmitted by way of a protection path to avoid the communication link failure.

If, by way of example, a link failure occurs in the portion of the working paths of ring 332 in between nodes 344 and 348, then all packets that are to be transmitted from node 300 to node 340, 344 and finally to node 348, are transmitted through a protection path along ring 336 directly from node 300 to node 348. This examples assumes that the working path traffic flows from node 300 to node 348 through nodes 340 and 344.

Figure 4:
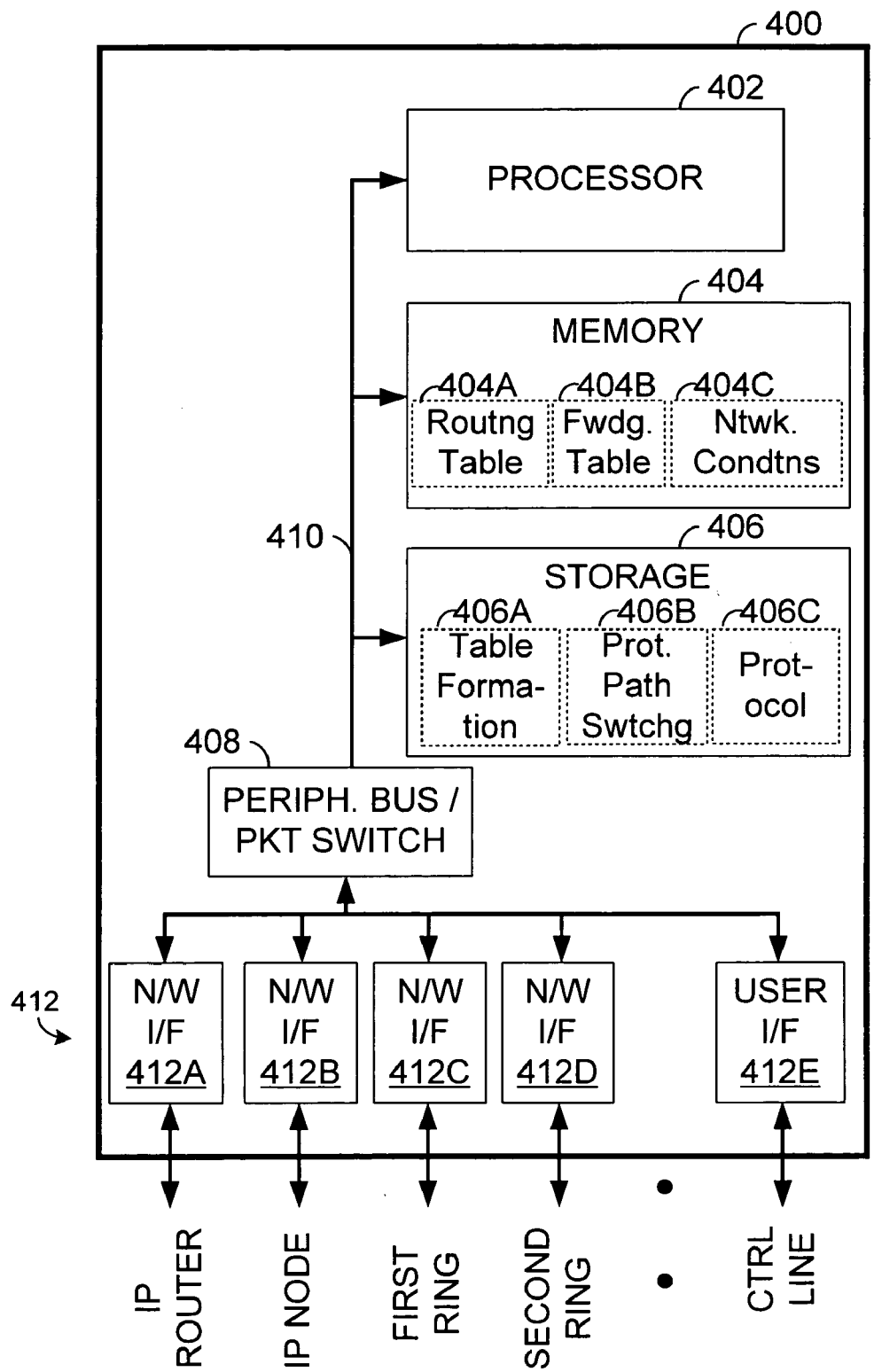
FIG. 4 is a functional schematic illustrating the components of a central ingress node according to a preferred embodiment of the invention.

FIG. 4 is a functional schematic illustrating the components of a central ingress node according to a preferred embodiment of the invention. Referring now to FIG. 4, an ingress node 400, for the purposes herein, is a node that receives IP traffic that requires routing through the fiber optic ring network. In the preferred embodiment of the invention, the ingress node 400 is responsible for determining the path route for a data packet through the fiber optic ring network.

Central ingress node 400 includes a processor 402 that is communicatively coupled to a memory 404, a storage device 406 and a peripheral bus interface/packet switch through a bus 410. Peripheral bus interface/packet switch 408, in turn, is communicatively coupled with network interface devices 412A, 412B, 412C, 412D and 412E. Each of these network interface devices are connected, for exemplary purposes, to an IP router, an IP node, a first ring of a fiber optic ring network, a second ring of a fiber optic ring network, and a communication control line, respectively. By way of example, the communication control line is coupled to each node on the fiber optic ring network for transmitting control signals or update signals from the central node to the other nodes on the network.

Storage device 406 can be formed of any one or of a plurality of devices for storing operational logic, protocol information, programming steps and instructions, and logic to convert signals from one protocol to another. By way of example, portion 406A is for storing instructions for creating forwarding and routing tables. Portion 406B is for storing operational logic for determining whether user traffic, on a packet by packet basis should be transmitted or forwarded through the fiber optic ring network through a working path or a protection path. Portion 406C is for storing programming and process steps for generating an overhead signal to all nodes on the fiber optic ring network to inform them of a detected communication link failure in an adjacent node.

In terms of hardware, storage device 406 comprises, in the described embodiment, a flash electronically erasable programmable read only memory (EEPROM) that has read/write capability. In additional embodiments, storage device 406 comprises read only memory (ROM) circuits, compact disk (CD) ROM devices, Read/Write CDs, tape drives, floppy disks (and similar devices), and other known information storage mediums including electromagnetic disk drives.

Storage device 406 of node 400 includes computer instructions that define logic for indicating and causing processor 402 to produce a signal on the fiber optic ring network indicating that a failure condition has occurred in an adjacent communication link on the fiber optic ring. There are many different indicators of failed communication links including the mere lack of receipt of expected communication signals. In the described embodiment, the information in storage device 406 causes processor 402 to generate an overhead signal that is used to inform other nodes on the fiber optic ring network of a detected failure. By way of example, if the fiber optic ring network is a SONET or SDH ring, processor 402 generates a k1/k2 overhead signal.

Those skilled in the art readily can appreciate the specific conditions that could cause a node to determine a communication link failure has occurred in an adjacent communication link. The computer instructions stored within storage device 406 also define logic for determining that traffic conditions on adjacent communication links require alternate routing/forwarding. By way of example, a specified amount of traffic congestion may be defined to require protection path switching. In the preferred embodiment of the invention, the computer instructions are selected to cause processor 402 to select between the working and protection paths according to traffic conditions on a packet by packet basis.

The computer instructions within storage device 406 also include instructions for creating routing and forwarding tables. To illustrate, as is known by those skilled in the art, an IP router includes logic for creating IP packet routing tables based upon network conditions. The phrase "network conditions" includes an awareness of the electrical presence of internet nodes and routers. The programming instructions within the central ingress node 400 include similar logic defined by its computer instructions. Additionally, however, the computer instructions in the storage device 406 also include programming steps to define the packet routing/forwarding through the fiber optic ring network.

In addition, the computer instructions within storage device 406 define logic for creating an MPLS forwarding table having entries that define path routes by way of the selected labels that are consistent with the defined routes of the routing table. Additionally, however, the labels define path routes for working as well as protection paths through the fiber optic ring network.

Memory 404 comprises random access memory (RAM) with read/write capability for storing operational information while node 400 is operational and is receiving power. By way of example, memory portions 404A and 404B are for storing the routing and forwarding tables, respectively, created by processor 402 while executing the programming instructions stored in memory portion 406A of storage device 406. Memory portion 406C is for storing information relating to network conditions. By way of example, if node 400 either determines on its own or is informed of a network communication link failure, information defining the type of failure and its location are stored in memory portion 406C of memory 406.

Additionally, information stored within storage device 406C defining the fiber optic network ring node such as the nodes that are electrically present, and the communication paths are stored in memory portion 404C for use by processor 402. Additionally, memory 404 includes data used by processor 402 while executing program steps or computer instructions defined in portions 406A, 406B and 406C of storage device 406 as well as in other portions of the storage device. Memory 404 also is for, among other things, storing a fiber optic ring failure condition that was determined by node 300 or that was indicated in a received overhead signal. In terms of hardware characteristics of memory 404, different types of memory may be used. By way of example, memory 404 can comprise 32 bit flash program storage, dynamic RAM, static RAM, etc. Processor 402 is a standard processing unit formed within similar computerized devices and is capable of controlling operations of the node 400 according to the operational logic defined within storage 406. Processors that may be used include customized ASIC devices, off the shelf processors including common commercially available microprocessors and other similar devices.

Peripheral bus interface/packet switch/packet switch 408 is an interface that allows processor 402 to communicate with and control the communications that occur over a plurality of network interface devices 412 that are coupled to peripheral bus interface/packet switch/packet switch 408. Network interface devices 412 are transceivers of various types that are coupled to communicate with specific devices. While the described embodiment includes a peripheral bus interface/packet switch 408, other known devices may be substituted according to system implementation. By way of example, a type of cross connect switch is used in an alternate embodiment of the invention. In an asynchronous transfer mode (ATM) network, a cell switch is used. Generally, according to system implementation, any type of packet switch may be used. In yet another embodiment, a demultiplexer may be used in place of peripheral bus interface/packet switch 408.

The network interface devices of FIG. 4 may be formed of different known interface systems. For example, they may comprise radio modems, digital signal processors, ASICs, T1/E1 interface devices, etc. The type of device utilized as a network interface device 412 is a function of the type of device with which it will be expected to communicate and can include transceivers of all known types. For example, an interface device coupled to a fiber optic ring is formed of an optical port for transmitting and receiving light pulses onto and from the fiber optic ring.

In operation, processor 402 of node 400, in the described embodiment, is operable, in conjunction with computer instructions in storage device 406, to detect and respond to the a communication link failure or traffic condition (e.g., congestion). Within the 15 milliseconds, processor 402 generates the overhead signal indicating a communication link failure or traffic condition within fifteen milliseconds of the communication link failure or condition being detected (collectively "communication link failure").

Similarly, in the described embodiment, processor 402 is operable, in conjunction with computer instructions in storage device 406, to detect and respond within a 35 millisecond period to a received overhead signal used to indicate a failure condition in a communication link within the fiber optic ring network. Stated differently, the programming instructions within storage device 406 are written to cause processor 402 to initiate protection path routing/forwarding within 35 milliseconds of receiving the overhead signal.

Any known scheme for causing a processing unit to respond promptly including an interrupt scheme may be used. By way of example, processor firmware may be used to generate a flag or interrupt to cause the processor to execute a specified routine to initiate protection path forwarding/switching.

Figure 5:
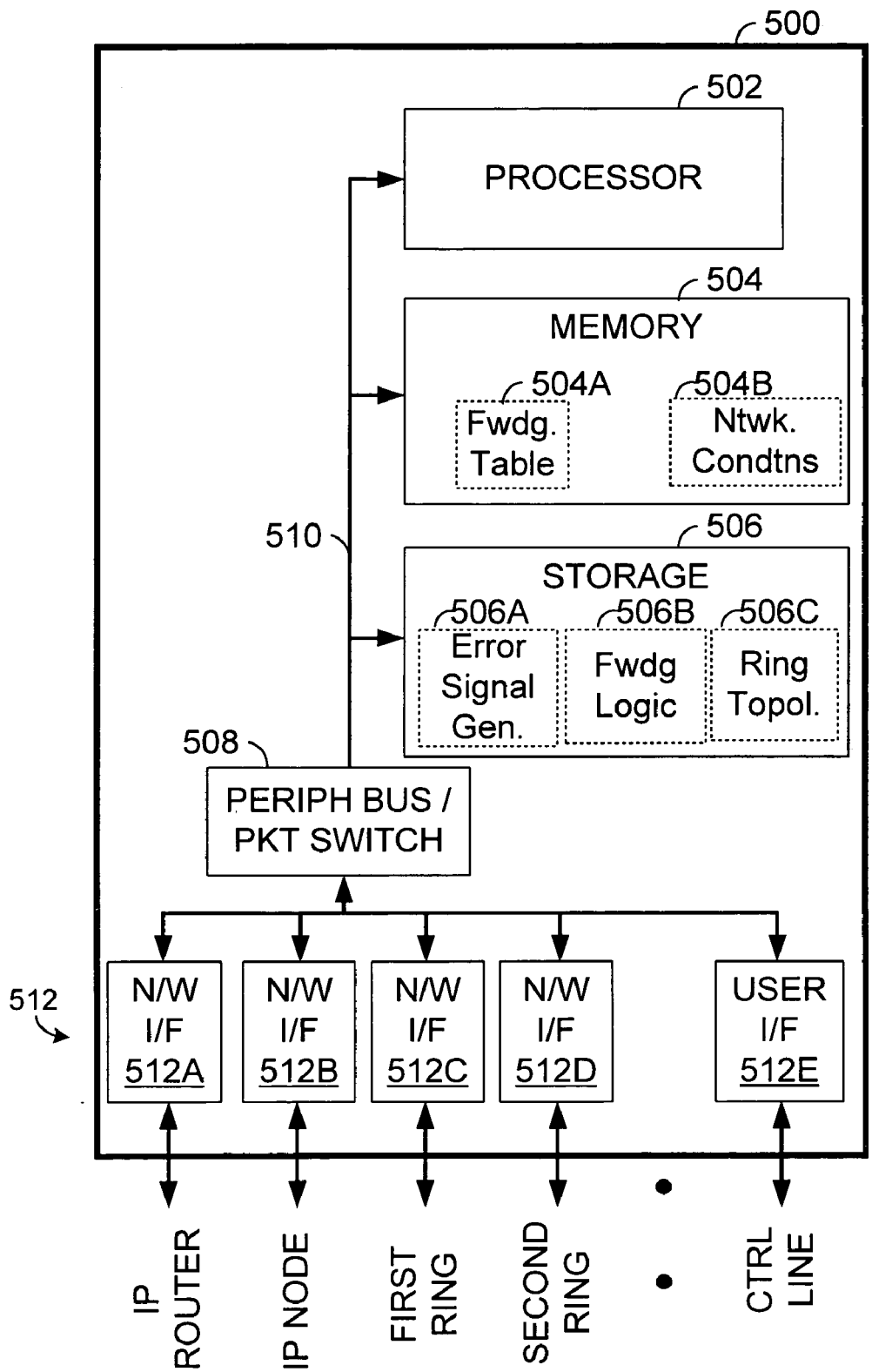
FIG. 5 is a functional schematic illustrating the components of a fiber optic ring network node according to a preferred embodiment of the invention.

FIG. 5 is a functional schematic illustrating the components of a fiber optic ring network node according to a preferred embodiment of the invention. In general, node 500 is for receiving and forwarding data packets on a fiber optic ring network. Node 500 includes a processor 502 that is communicatively coupled to a memory 504, a storage device 506 and a peripheral bus interface/packet switch through a bus 510. Peripheral bus interface/packet switch, in turn, is communicatively coupled with network interface devices 512A, 512B, 512C, 512D and 512E. Each of these network interface devices are connected, for exemplary purposes, to an IP router, an IP node, a first ring of a fiber optic ring network, a second ring of a fiber optic ring network, and a communication control line, respectively.

Storage device 506 can be formed of any one or of a plurality of devices for storing operational logic, protocol information, programming steps and instructions for specified functions. By way of example, portion 506A is for storing instructions for creating and generating error signals regarding communication link failures whenever specified conditions are detected in an adjacent ring. Portion 506B is for storing operational logic for forwarding received packets, on a packet by packet basis through the fiber optic ring network either through a working path or a protection path. Portion 506C is for storing ring topology information for using in determining how to forward a received data packet.

In terms of hardware, storage device 506 comprises, in the described embodiment, an electromagnetic disk drive that has read/write capability. In additional embodiments, storage device 506 comprises read only memory (ROM) circuits, compact disk (CD) ROM devices, Read/Write CDs, tape drives, floppy disks (and similar devices), and other known information storage mediums.

With respect to the programming instructions stored in portion 506A of storage device 506 of node 500, storage device 506 includes computer instructions that define logic for indicating and causing processor 502 to produce a signal on the fiber optic ring network. This signal is for indicating that a failure condition has occurred in an adjacent communication link on the fiber optic ring. There are many different indicators of failed communication links including the mere lack of receipt of expected communication signals.

In the described embodiment, the information in storage device 506 causes processor 502 to generate an overhead signal that is used to inform all other nodes on the fiber optic ring network of a detected failure. By way of example, if the fiber optic ring network is a SONET ring, processor 502 generates a k1/k2 overhead signal that is transmitted to all nodes on the fiber optic ring network.

Those skilled in the art readily can appreciate the specific conditions that could cause a node to determine a communication link failure has occurred in an adjacent communication link. The computer instructions stored within storage device 506 also define logic for determining that traffic conditions on adjacent communication links require alternate routing/forwarding. By way of example, a specified amount of traffic congestion may be defined to require protection path switching.

The computer instructions within storage device 506 also include instructions for determining how to forward a received packet. The computer instructions within storage device 506B define logic for forwarding data packets according to an MPLS forwarding table stored in memory. As will be described in greater detail below, the computer instructions in portion 506B prompt processor 502 to switch label values for a received packet and to forward the packet according to the newly inserted label value. The MPLS labels define path routes for working as well as protection paths through the fiber optic ring network.

The computer instructions within portion 506A of storage device 506 include defined topology information for the fiber optic ring network. By way of example, information regarding each of the nodes 500 in the ring as well as their node IDs and, in some embodiments, their port IDs. The use of the port IDs and node IDs will be described in greater detail below.

Memory 504 comprises random access memory (RAM) with read/write capability for storing operational information while node 500 is operational and is receiving power. Memory portions 504A and 504B are for storing information regarding forwarding tables and network conditions, respectively. By way of example, if node 500 either determines on its own or is informed of a network communication link failure, information defining the type of failure and its location are stored in memory portion 506A of memory 506. The forwarding table in memory portion 504A is stored in an MPLS format. Other formats for the forwarding information may also be used for the forwarding to packets through the fiber optic ring network.

In terms of hardware characteristics of memory 504, different types of memory may be used. By way of example, memory 504 can comprise 32 bit flash program storage, dynamic RAM, static RAM, etc. Processor 502 is a standard processing unit formed within similar computerized devices and is capable of controlling operations of the node 500 according to the operational logic defined within storage 506. Processors that may be used include customized ASIC devices, off the shelf processors including common commercially available microprocessors and other similar devices.

Continuing to refer to FIG. 5, processor 502 also is coupled to transmit and receive user traffic on the fiber optic ring network through a plurality of network interface devices 512A through 512E by way of a peripheral bus interface/packet switch device 508 and a bus 510. The exemplary connections of the interface devices are shown. By way of example, interface device 512E may be coupled to receive communication control commands from a central node of the fiber optic ring network.

Peripheral bus interface/packet switch 508 is a standard bus interface that allows processor 502 to communicate with and control the communications that occur over a plurality of network interface devices 512 that are coupled to peripheral bus interface/packet switch 508. Network interface devices 512 are transceivers of various types that are coupled to communicate with specific devices. While the described embodiment includes a peripheral bus interface/packet switch 508, other known devices may be substituted according to system implementation. By way of example, a type of cross connect switch is used in an alternate embodiment of the invention. In an asynchronous transfer mode (ATM) network, a cell switch is used. Generally, according to system implementation, any type of packet switch may be used. In yet another embodiment, a demultiplexer may be used in place of peripheral bus interface/packet switch 508.

The network interface devices of FIG. 5 may be formed of different known interface systems. For example, they may comprise radio modems, digital signal processors, ASICs, T1/E1 interface devices, etc. The type of device utilized as a network interface device 512 is a function of the type of device with which it will be expected to communicate and can include transceivers of all known types.

In operation, processor 502 of node 500, in the described embodiment, is operable, in conjunction with computer instructions in storage device 506, to detect and respond to the a communication link failure or traffic condition (e.g., congestion). Within the 15 milliseconds, processor 502 generates the overhead signal indicating a communication link failure or traffic condition within fifteen milliseconds of the communication link failure or condition being detected (collectively "communication link failure").

Figure 6:
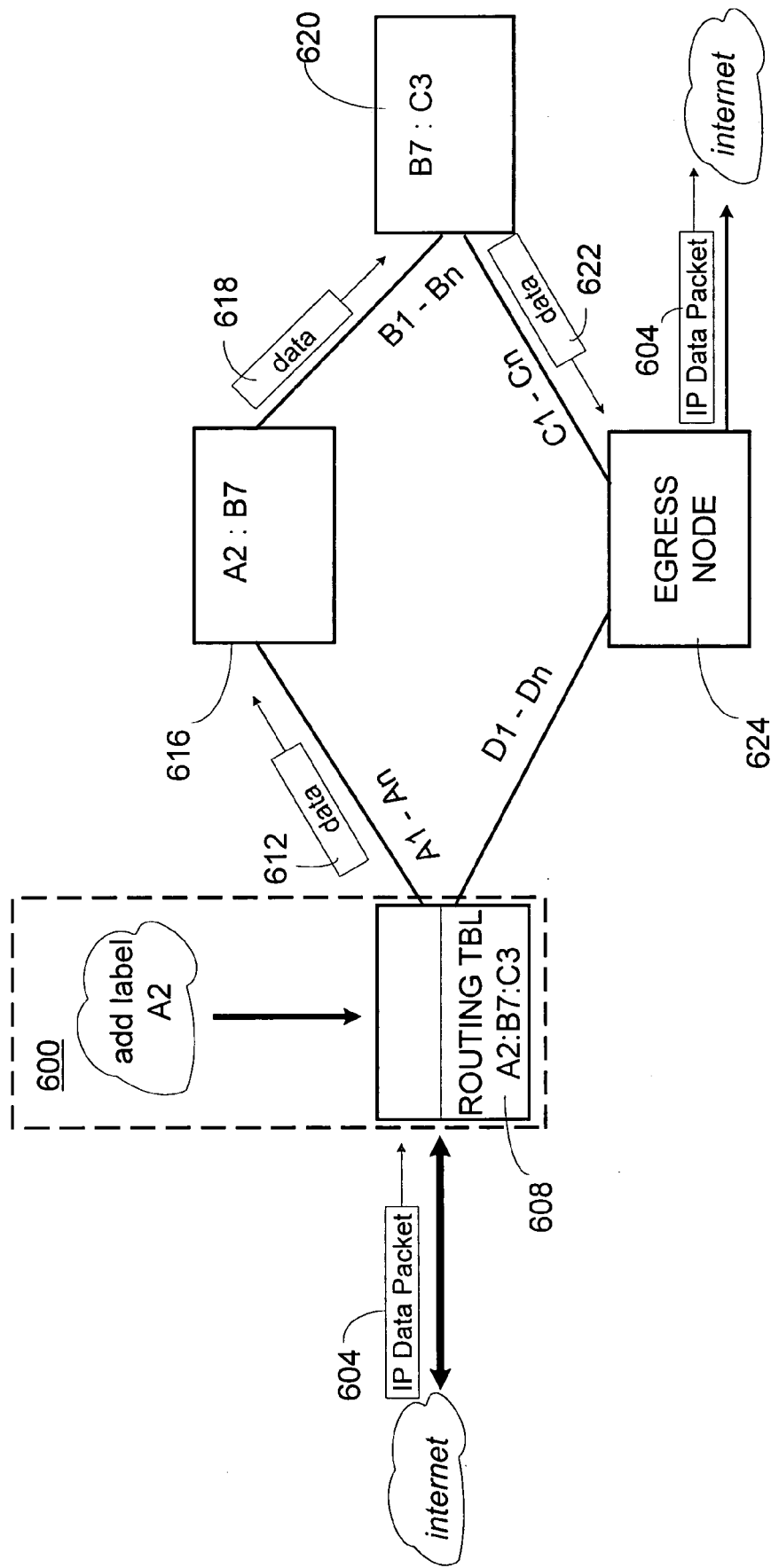
FIG. 6 is a functional block diagram illustrating packet level forwarding in a fiber optic ring network using multi-packet label switching and forwarding tables according to a preferred embodiment of the invention.

FIG. 6 is a functional block diagram illustrating packet level forwarding in a fiber optic ring network using multi-packet label switching and forwarding tables according to a preferred embodiment of the invention. A fiber optic ring network central node 600 is coupled to receive IP data packets 604 from the internet. In addition to node 600, the fiber optic network ring includes nodes 616, 620 and 624. Node 600 includes a memory 608 for storing routing/forwarding information. Node 616 includes a memory for storing a forwarding table that maps label A2 to label B7. Node 620 includes a memory for storing a forwarding table that maps label B7 to label C3.

In operation, node 600 must change the format of the received IP packet 604 to a specified format, by way of example, to an MPLS format. In the process of forming a packet, by way of example, an MPLS packet, node 600 adds a label to create data packet 612. The label implicitly defines a path route for the next communication link. For the example herein, node 600 adds label A2 to the data packet 604. As may be seen, memory 608 includes a defined path route through the fiber optic ring network. For any packet given the label A2, that packet will be transmitted in a channel or path assigned labels A2, B7 and C3. For the example herein, data packet 604 has a destination node within the fiber optic ring network of node 624 prior to be exported to another network device such as a specified internet router.

Node 500 transmits data packet 612 over a channel that corresponds to label A2. When data packet 612 reaches node 616, its label A2 is replaced with label B7 by node 616 and then is transmitted over the channel that corresponds with label B7 as data packet 618. Similarly, node 620 replaces the label B7 with label C3. The data packet is then transmitted as data packet 622 over the channel that corresponds with label C3.

In the example herein, each of the nodes 616, 620 and 624 examine information within the headers of the received data packets to determine whether it is the final destination on the fiber optic ring network for the packet. In the example of FIG. 6, the final node of the fiber optic ring network to receive the data packet is node 624. Node 624, upon receiving the data packet, examines a port ID within the header to determine that the specified port ID is a port of node 624.

Other designs may also be used to accomplish the same result. Rather than having the nodes examine port IDs in the header of the received data packets, the forwarding tables may be used to achieve the same result. By way of example, the memory of node 624 that contains the forwarding tables may be formed to include a port ID to correspond to label C3 (the label that is inserted into the packet by node 620) that defines a specified port connected to an external device. Such a specified port ID, therefore, would cause node 624 to realize that the packet is to be output through a specified port to a device that is external to the fiber optic ring network.

In either embodiment, node 624 extracts the destination IP address from the header of the packet, converts the packet back to an IP format (along with other packets if necessary) and routes the packet back on to the internet to reach its destination. Those skilled in the art readily know how to convert packets back and forth between an MPLS format (or whatever TDM format being used within the fiber optic ring) and an IP format.

Figure 7:
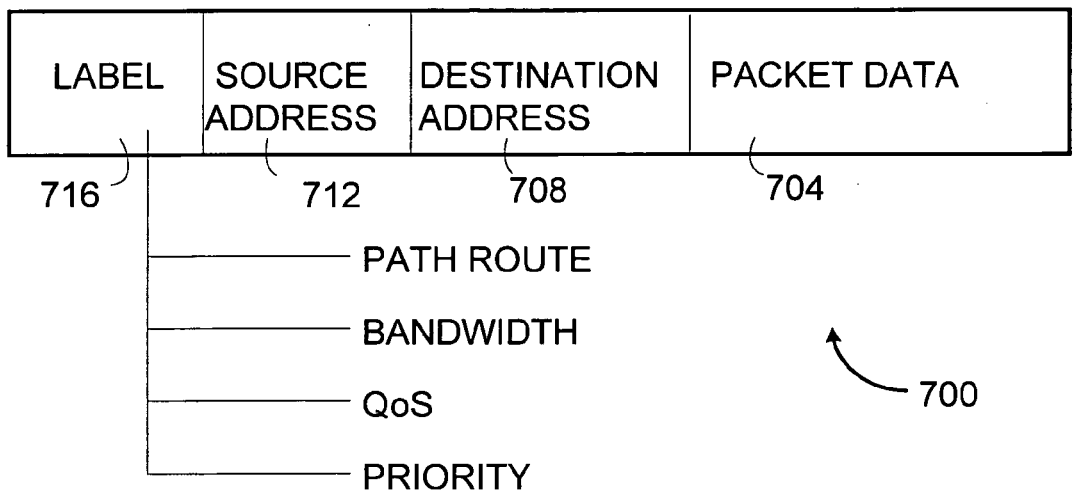
FIG. 7 is a diagram illustrating the elements of a user traffic data packet transmitted by a node on a fiber optic ring network according to a preferred embodiment of the invention.

FIG. 7 is a diagram illustrating the elements of a user traffic data packet transmitted by a node on a fiber optic ring network according to a preferred embodiment of the invention. Referring now to FIG. 7, an IP packet that is received by a central node 500 is converted to at least one data packet such as the MPLS data packet 700 shown in FIG. 7. The data of the IP data packet is inserted within portion 704. Some packet formats for common fiber optic ring networks include fixed length packets. Accordingly, a plurality of packets may be required if the data portion of the IP packet exceeds the capacity of the fixed length packet. For example, in ATM based fiber optic ring networks, a fixed length packet known as a cell has 48 bytes for carrying user traffic data. Accordingly, an IP packet having more than 48 bytes of data will require a plurality of cells to transport the data from the IP data packet through the fiber optic ring network.

While IP user traffic data is placed within portion 704 of at least one data packet 700, the IP destination address is placed within portion 708 and the IP source address is placed within portion 712. As is also shown in FIG. 7, the packet label (MPLS label) is placed in portion 716.

Because the preferred embodiment of the invention utilizes an MPLS scheme for transporting data packets, the label of portion 716 implicitly represents or defines a plurality of different sets of information. By way of example, the label represents the path route that is to transport the data packet for the next communication link. In addition to the path route, the label in the described embodiment also implicitly represents a quality of service (QoS) rating that is associated with the data packet. As is understood by those skilled in the art, QoS provisioning usually specifies the priority that a given user receives for the user traffic especially in interference situations. Interference situations include those situations where, at a given moment, the demand for channeling resources exceeds throughput capacity.

Different throughput rates (or levels of priority in a QoS system) typically have different cost structures. Accordingly, in the case of traffic congestion, QoS priority schemes are used to determine what signals are transmitted or are transmitted first. Finally, in the preferred embodiment, a priority indication for reasons other than QoS are specified. For example, communications by public officials regarding important public events may be given a high priority.

Finally, the label value inserted into portion 716 also implicitly reflects the bandwidth of the channel being used to transmit the data packet. As may be seen by examining FIG. 7, if a signal is given a high priority (e.g., a signal being transmitted by a government agency in an emergency situation), that high priority can also be implicitly determined by the label assignment. Typically, it may be difficult to distinguish between a label for a signal being given high priority and a label for a signal having a high QoS rating. As a general observation, however, a priority signal would receive at least as much priority as a highest QoS rating. Accordingly, it is only in the situation wherein a signal receives an optimal label assignment that some ambiguity may exist as to whether it is a priority signal or a signal with a high QoS. In one embodiment, high priority signals merely receive the highest QoS rating available to expedite their transmission through the fiber optic ring network.

Figure 8:
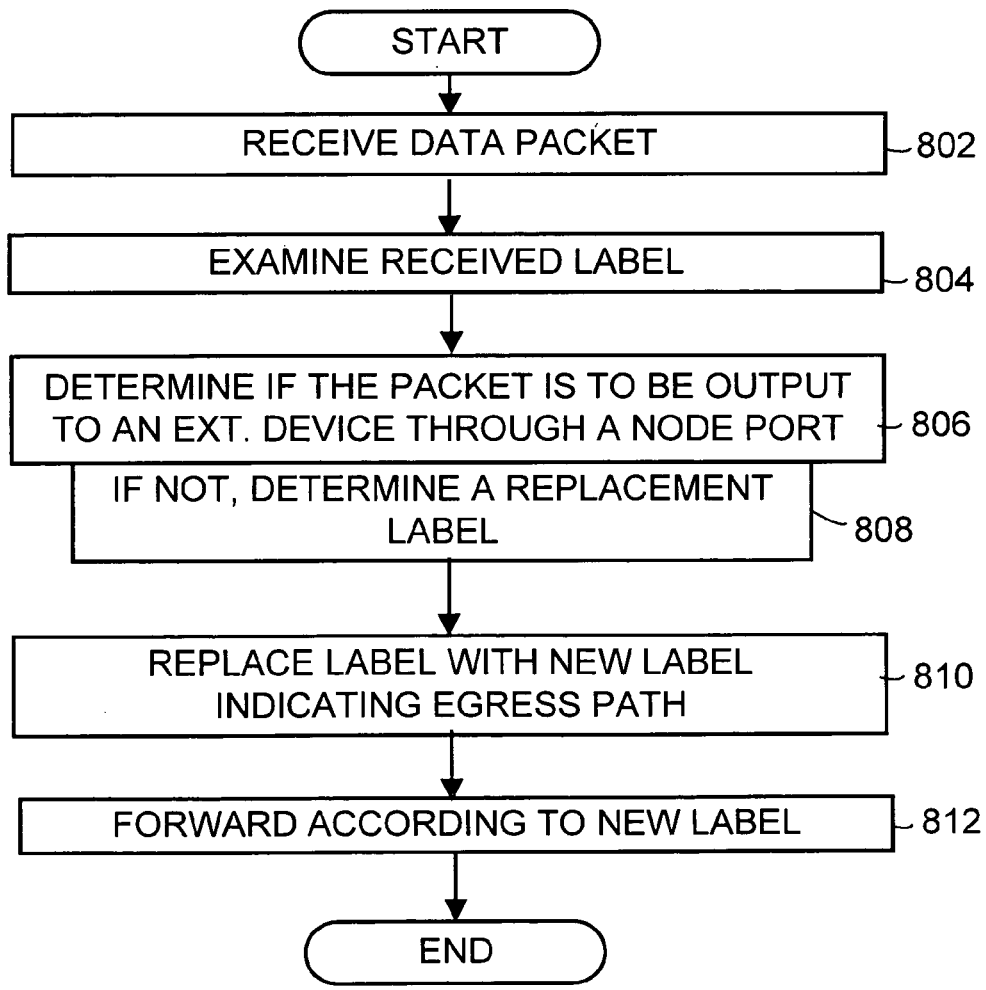
FIG. 8 is a flow chart illustrating a method in a node for forwarding a packet of data on a TDM fiber optic ring network according to a preferred embodiment of the invention.

FIG. 8 is a flow chart illustrating a method in a node for forwarding a packet of data on a TDM fiber optic ring network according to a preferred embodiment of the invention. Referring now to FIG. 8, a node, by way of example, node 616 of FIG. 6 receives a data packet similar to packet 612 of FIG. 6 (step 502). The node then examines the label of the received packet to determine how to process the packet (step 504). By way of example, the processor of the node communicates with its internal storage device that contains programming instructions. The processor executes the programming instructions to extract the label in the received packet and to store it in memory for further analysis. Thereafter, the node determines whether the packet is to be reconstructed into an IP packet and then output from an output port of the node (step 806). More specifically, the processor (according to stored computer instructions), in the preferred embodiment, examines a specified port identifier that identifies an egress port from the fiber optic ring network to an external device (e.g., to an IP router or IP node external to the fiber optic ring network). If the port identifier is one of the nodes processing the data packet, then the node examines a forwarding table as a part of processing and forwarding the packet.

In an alternate embodiment, rather than examine a port identifier, the node merely examines the received label. Then, from examining the contents of the forwarding table it knows whether to forward the packet with a new label value or whether to output the packet through an egress port. More specifically, if the forwarding table includes an egress port identifier instead of a replacement label, then the node knows to reconstruct the packet into an IP format and to output it through the egress port identified in the forwarding table.

Assuming that node is not the final destination node on the fiber optic ring network, and after the node has determined the corresponding replacement label for the label that was received with the packet, the processor replaces the received label with the corresponding label value that it determined (step 810). The node then forwards packet according the new label value (step 812) in a specified channel that corresponds to the replacement label.

Figures 9, 12A, 12B:
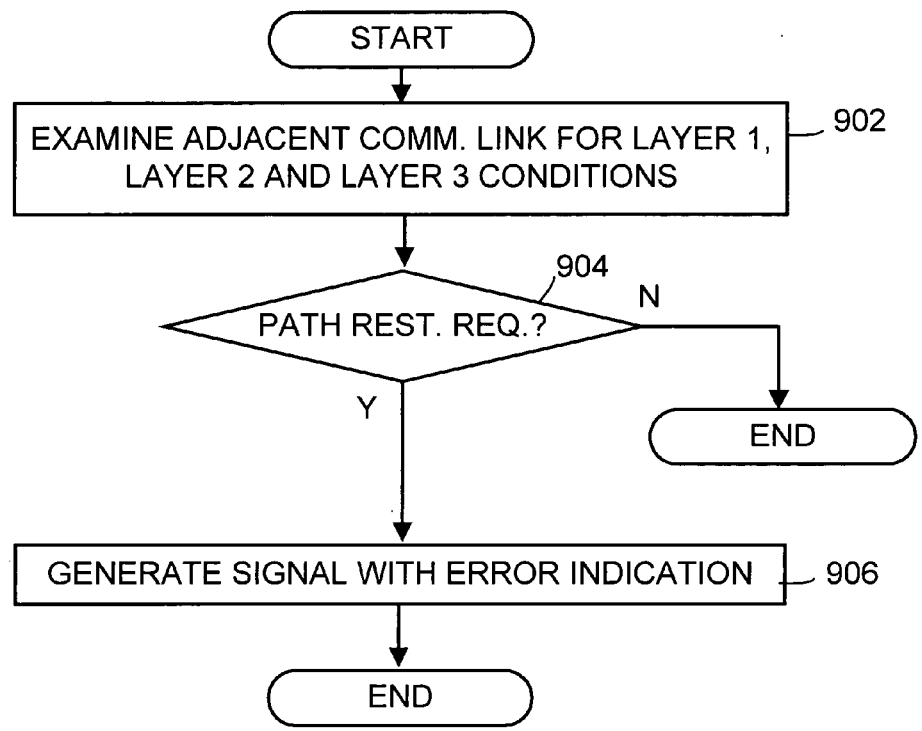
FIG. 9 is a flow chart illustrating a method in a node for detecting a communication link failure and for sending a signal to other nodes in the fiber optic ring network to inform them of the communication link failure.
FIGS. 12A and 12B are tables that illustrate a method for protection path resource allocation according to an embodiment of the invention.

FIG. 9 is a flow chart illustrating a method in a node, by way of example nodes 300, 340, 344 or 348 or nodes 400 and 500 of FIGS. 4 and 5, respectively, for detecting a communication link failure and for sending a signal to other nodes in the fiber optic ring network to inform them of the communication link failure. Referring now to FIG. 9, a node, by way of example, node 344, examines the adjacent communication links to verify that they are operating properly (step 902).

In the preferred embodiment, the examination of the adjacent communication links occurs on a periodic basis at a frequency that exceeds approximately 60 times per second. Node 344 examines the adjacent communication links for layer 1, layer 2 and layer 3 types of failures. By way of example, node 344 examines the upstream and downstream links of ring 332 of FIG. 3 for communication link failures. Additionally, the term "failure", as used herein, includes layer 1 and layer 2 failures as well as layer 3 detected conditions including, by way of example, traffic congestion. The types of detectable failures are not limited merely to severe failures in which signals are not being successfully transmitted through the communication link.

The computer instructions that enable a processor within a node to determine that a failure at any of the three OSI layers has occurred are stored within the storage device of the node. In the preferred embodiment, computer instructions include programming steps to detect error conditions in a variety of ways. More specifically, the computer instructions include programming steps to prompt the node to test the communication link, to verify that no fault or error conditions are being indicated through routine error checking approaches, and to monitor transmission delays and whether specified signals are being received on a timely basis. For example, the failure of a successful communication over a link as determined either by uncompleted handshaking between nodes or by the failure of node 348 to receive an expected signal within a specified period indicates a communication link failure in an adjacent communication link.

After examining the adjacent communication link conditions, node 348 determines whether any detected conditions or failures are of a type that require an ingress node, e.g., node 300 of FIG. 3, to provide path restoration (step 904). Path restoration is the switching of communication link path routes from a working path to a protection path for at least some of the affected user data packets. If there is not a problem or condition that requires path restoration, the method illustrated in FIG. 9 is complete until its next execution.

If a communication link failure does requires path restoration, i.e., the forwarding of some packets over the protection path, our exemplary node 344 generates an overhead signal on all rings (if more than one) to inform all other nodes on the fiber optic ring network of the communication link failure and its location (step 906). By way of example, in a SONET ring network, k1/k2 overhead bytes are used to reflect a problem in a communication link and its location. By transmitting the overhead signal to all of the nodes on the fiber optic ring network, each node that serves as an ingress node for TCP/IP data packets is made aware of the traffic condition. This allows each ingress node to modify its routing/forwarding tables, if necessary. Additionally, it allows the ingress nodes to assign labels that will cause data packets to be forwarded through the protection path if its working path is affected by the failure.

With reference again to the previous discussion and the use of protection paths to respond to failures in a communication link, the overhead signaling that occurs in the described embodiment to advise an ingress node of a communication link failure occurs at layer 2 even though the condition may be a layer 1 or a layer 3 condition. Given that each node includes logic to perform the method of FIG. 9, each of the two nodes that are adjacent to the communication link failure will generate the overhead signal identifying the failure condition.

Moreover, the programming instructions are, in the described embodiment, created to perform the testing and error detection analyses at frequency rate that enables a communication link failure to be detected and responded to within a period of fifteen milliseconds.

Figure 10:
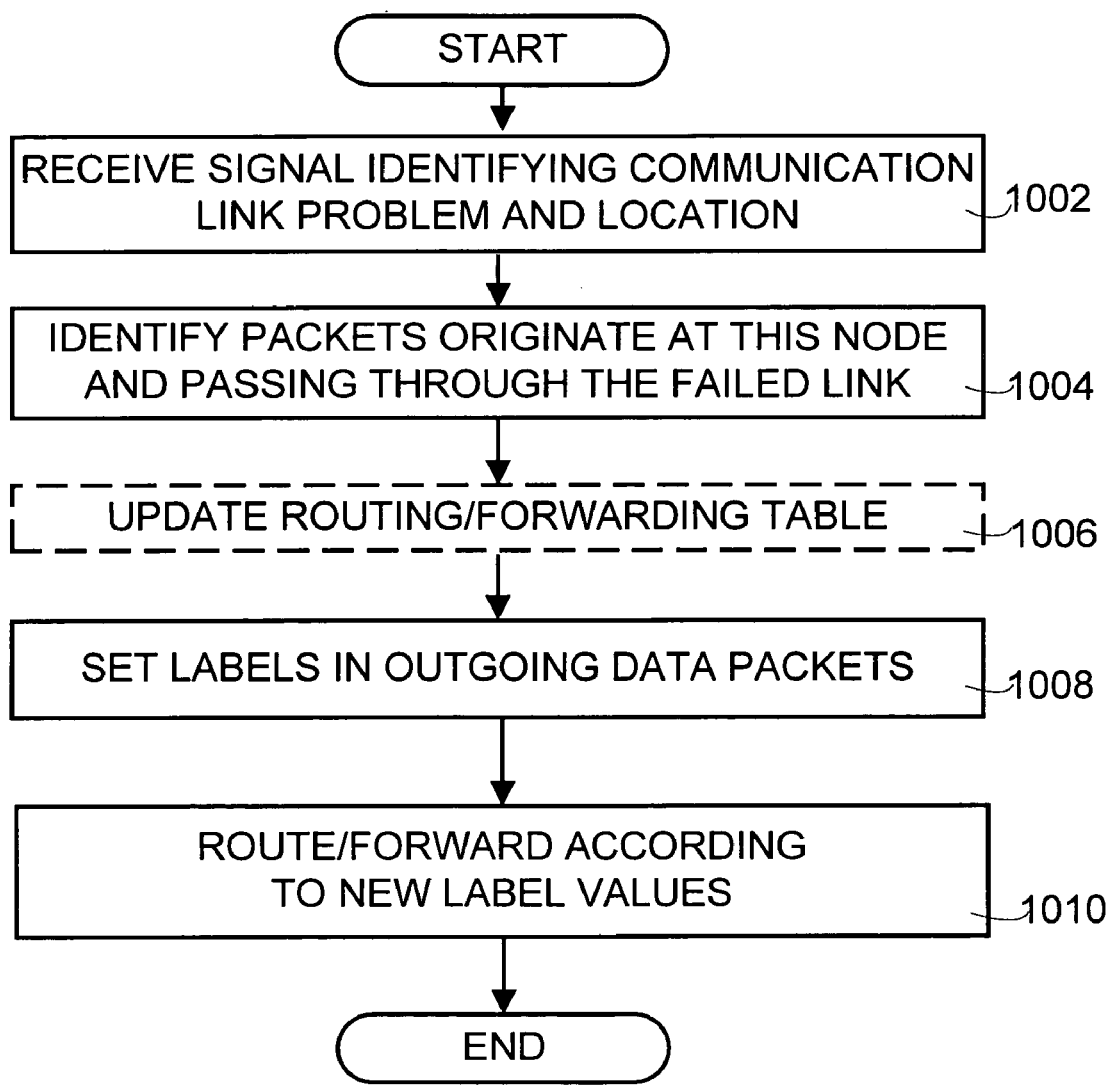
FIG. 10 is a flow chart illustrating a method in a fiber optic ring network node for controlling forwarding/routing of the IP traffic through the fiber optic ring according to a preferred embodiment of the invention.

FIG. 10 is a flow chart illustrating a method in a fiber optic ring network node for controlling forwarding/routing of the IP traffic through the fiber optic ring according to a preferred embodiment of the invention. Referring now to FIG. 10, an ingress node for IP traffic, for example, node 300, receives an overhead signal that contains an indication that a communication link in the fiber optic ring network has failed (step 1002). As before, "failed" includes OSI level 3 determinations and the location of the failure. The signal containing the indication may be received from any node on the fiber optic ring network, by way of example, from nodes 340, 344 or 348.

After receiving the signal indicating that a communication link failure or condition has occurred, ingress node 300 identifies the IP packets that it has received for transmission through the fiber optic ring network that pass through the failed communication link in their defined working paths (step 1004). In the described embodiment, the central (ingress) node maintains a link list that maps communication links to defined paths in the fiber optic ring network.

For at least some types of failures, the ingress node updates its forwarding/routing tables to modify the defined working and protection paths for the data packets it generates onto the fiber optic ring network (step 1006).

After the identifying step 1004, the ingress node 300 determines appropriate protection path label values for the affected data packets and sets the labels into the header of the outgoing data packets (step 1008). Finally, the affected data packets are generated onto the fiber optic ring network and are forwarded along the protection paths according to the newly set label values.

Because it is an object of the present invention to provide fast path restoration or switching, the computer instructions in the ingress node in the described embodiment are formed to cause the ingress node to perform the protection path switching within 35 milliseconds of receiving the overhead signal in step 1002. Because the computer instructions in the nodes in the described embodiment are formed to generate the overhead signal reflecting an error condition within fifteen milliseconds and the ingress nodes include computer instructions formed to respond to the received overhead signal within thirty five milliseconds, the entire network is created to respond and provide path restoration in a period of fifty milliseconds from a communication link failure.

Alternatively, if the ingress node that determines that a failure condition has occurred in an adjacent communication link, it will respond and provide path restoration within thirty five milliseconds of detecting the failure condition in addition to generating an overhead signal to all other nodes within fifteen milliseconds.

Figure 11:
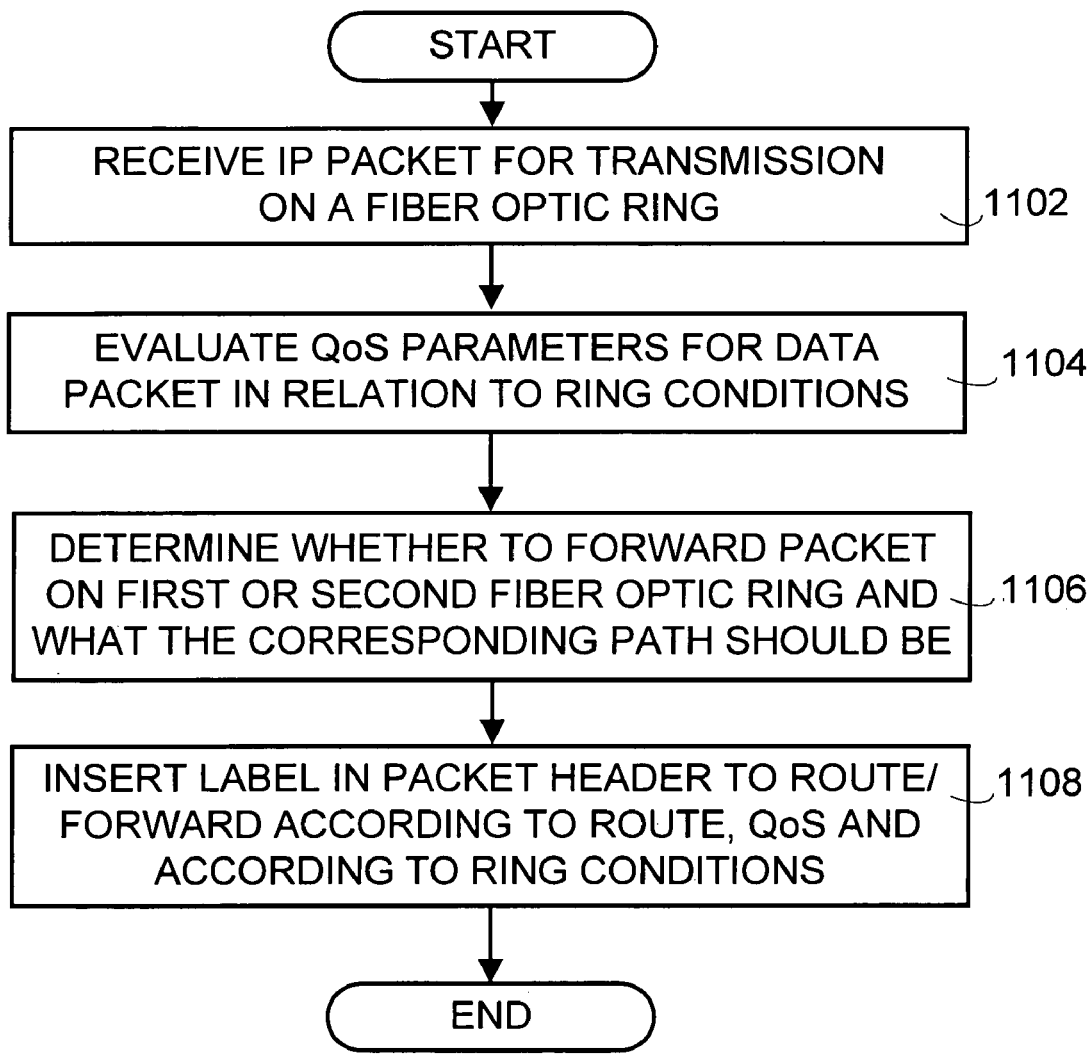
FIG. 11 is a flow chart illustrating a method in a fiber optic ring network node for receiving IP user traffic from an external source and for transmitting it over a fiber optic ring network according to a preferred embodiment of the invention.

FIG. 11 is a flow chart illustrating a method in a fiber optic ring network node for receiving IP user traffic from an external source and for transmitting it over a fiber optic ring network according to a preferred embodiment of the invention. Referring now to FIG. 11, a node, by way of example, node 340 of FIG. 3, receives an IP packet and converts it to a TDM protocol for transmission on the fiber optic ring network (step 1102). If the fiber optic ring network is a SONET ring utilizing an ATM protocol, and, for example, and if the actual data of the IP packet exceeds 48 bytes, then a plurality of cells (packets) are used to transport the IP packet over the fiber optic ring network.

If the IP data packet included a QoS parameter, the label value assigned to the packet will reflect a QoS rating or rank. Alternatively, if an IP data packet does not have a QoS value stored within it, node 300 assigns label values reflecting a QoS rank or rating according to either the source or final destination of the IP data packet or to the signal type. As a part of determining an appropriate label value reflecting a QoS rating, the node also compares the QoS rating to the rating of all other packets that are to be transmitted. Accordingly, in an interference situation (wherein the instantaneous demand exceeds capacity), the packets having higher QoS ratings will receive labels having label values that gives those packets relative priority through the plurality of paths within a fiber optic ring network. In other words, the QoS rating is evaluated to ring conditions on the first and second rings as a part of assigning a label having a specified label value (step 1104).

Additionally, as a part of assigning a label value, the node determines whether the data packet is to be transmitted on the first or second ring and what the corresponding path should be based upon its QoS rating and upon the ring conditions in each ring (step 1106). After evaluating the QoS rating, ring conditions and the relative QoS ratings of all of the packets waiting to be transmitted onto the fiber optic ring network, a corresponding label is inserted into the header of the packet and the packet is forwarded on the corresponding path (step 1108).

FIGS. 12A and 12B are tables that illustrate a method for protection path resource allocation according to an embodiment of the invention. Referring now to FIG. 12A, a traditional resource allocation scheme includes reserving equal amounts of resources for protection paths and amounts of resources for working paths. Stated differently, a one to one relationship exists between working path and protection path resources. Thus, as may be seen, each channel identified in the left hand column of the table in FIG. 12A for the working paths includes a unique channel assigned to it for protection path forwarding.

Referring now to FIG. 12B, however, a different resource allocation scheme is disclosed. The table of FIG. 12B illustrates a four to one resource allocation scheme. As may be seen, only one protection path B is reserved for restoration or protection path forwarding for the four working paths A, C, E and G. For the example of FIG. 12A, each of the reserved protection path channels is equal in throughput capacity to its corresponding working path channel. In the example of FIG. 12B, however, there is no such correlation because there is an "N" to one ratio instead of a one to one ratio between the working and protection path throughput capacities.

For each embodiment employing an N to one ratio between the working paths and the protection paths, interference situations are resolved through a QoS priority scheme on a packet by packet basis in relation to ring conditions including traffic conditions. In one embodiment, no channels are reserved for protection path switching. Rather, QoS is used solely to determine traffic priority. As may be seen, for each of the described embodiments, working path channels are defined on both rings in a two ring bidirectional line switched ring (BLSR) system. In a one ring unidirectional path switched ring (UPSR) system, working path traffic channels are defined for transmissions in both directions through the fiber optic ring (clockwise and counter-clockwise). The packet level forwarding and switching in relation to ring conditions and to QoS priority rankings of the various data packets are what allow a system to be designed in which there is not a 1:1 protection path to working path relationship in terms of reserved channels. Accordingly, a scheme may be implemented in which a 1:N ratio is implemented for protection path switching. Moreover, in a scheme utilizing QoS, a scheme may be implemented in which there are no reservations for protection path switching as was described herein. Whether an N:1 ratio is used for protection path switching or whether no protection paths are defined wherein QoS ranking determines priority forwarding is a matter of design choice according to system requirements.

Each of the above methods are explained and shown separately. Each of the methods, however, may readily be combined with other and all of the described methods as described or in a modified format. Conversely, not all of the described methods necessarily need to be included in practicing the described invention. For example, the inventive methods and structures may be combined with existing systems. Thus, for a fiber optic ring network, a BLSR or a UPSR scheme may be practiced for specified paths while the inventive scheme is practiced for the remaining paths.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. For example, the described embodiments include two ring systems. One ring systems capable of conducting user traffic in both directions may readily be substituted for a two ring system.

We claim:

1. A label switched router for receiving packet flows and routing the packet flows through a fiber optic ring network, the router comprising:

a routing table that includes label switched working paths and label switched protection paths;

a network interface unit that inserts a routing label on packets and converts the packets to a synchronous optical signal for transmission on the fiber optic ring network;

a network condition unit for receiving and storing a failure indication received on overhead of a synchronous optical signal from the fiber optic ring network;

in response to receiving the failure indication on the overhead of a synchronous optical signal in the fiber optic ring network, a protection path switching unit for determining packets that are to be transmitted on working paths affected by the failure and relabeling the packets for transmission on a label switched protection path in the fiber optic ring network; and wherein the failure indication in the overhead of the synchronous optical signal indicates a failed link or congested traffic conditions on a link in the fiber optic ring network, and wherein the failure indication includes information on type of problem and link location.

2. The label switched router of claim 1, wherein the fiber optic ring network is a Synchronous Optical Network (SONET) network and the overhead failure signal is included in K1 and K2 bytes of SONET overhead.

3. The label switched router of claim 1, wherein the fiber optic ring network is a Synchronous Digital Hierarchy (SDH) network and the overhead failure signal is included in overhead bytes of SDH overhead.

4. The label switched router of claim 1, wherein the network interface unit that inserts a routing label on packets includes a quality of service rating in the routing label.

5. The label switched router of claim 4, wherein the protection path switching unit prioritizes packets to be relabeled on a packet by packet basis for transmission on a label switched protection path by the quality of service rating in the routing label.

6. A method for protection switching in a label switched router with an interface to a synchronous optical network, comprising:

labeling packets to be transmitted on the synchronous optical network over a label switched working path and converting the packets into a synchronous optical format;

receiving a failure indication in overhead bytes of the synchronous optical network that an adjacent link has a failure or traffic congestion;

accessing a routing table that indicates label switched protection paths assigned to each label switched working path; and labeling packets that were to be transmitted over the failed link to the assigned label switched protection path in response to the failure indication in the overhead bytes of the synchronous optical network.

7. The method of claim 6, wherein the failure indication in overhead bytes of the synchronous optical network is included in K1 and K2 overhead bytes of a synchronous optical network (SONET) frame.

8. A label switched router for receiving packet flows and routing the packet flows through a fiber optic ring network, the router comprising:

a network condition unit for periodically determining if a failure has occurred in an adjacent link to the label switched router, wherein the failure includes layer 3 type network conditions;

a network interface unit that inserts a routing label on received packets, converts the packets to a synchronous optical signal for transmission on the fiber optic ring network and in response to a failure being indicated by the network condition unit, inserting a failure indicator in overhead of the synchronous optical signal; and a protection path switching unit for determining packets that are to be transmitted on working paths affected by the failure and relabeling the packets for transmission on a label switched protection path in the fiber optic ring network.

* * * * *